United States Patent
Sor et al.

(10) Patent No.: US 12,353,312 B1
(45) Date of Patent: Jul. 8, 2025

(54) CODE PROFILING CALL STACK LINKING

(71) Applicant: SPLUNK Inc., San Francisco, CA (US)

(72) Inventors: Vladimir Sor, Tartu (EE); Gleb Smirnov, Tartu (EE); Chengyu Yang, San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 328 days.

(21) Appl. No.: 17/733,136

(22) Filed: Apr. 29, 2022

Related U.S. Application Data

(60) Provisional application No. 63/256,920, filed on Oct. 18, 2021.

(51) Int. Cl.
G06F 11/32 (2006.01)
G06T 11/20 (2006.01)

(52) U.S. Cl.
CPC .......... G06F 11/323 (2013.01); G06T 11/206 (2013.01); *G06F 2201/865* (2013.01)

(58) Field of Classification Search
CPC .............. G06F 11/323; G06F 11/3636; G06F 2201/865; G06T 11/206
See application file for complete search history.

(56) References Cited

U.S. PATENT DOCUMENTS

| | | | |
|---|---|---|---|
| 6,751,789 B1 * | 6/2004 | Berry | G06F 11/3466 717/130 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,282,268 B1 * | 5/2019 | Cherian | G06F 11/3636 |
| 10,528,451 B2 * | 1/2020 | O'Dowd | G06F 11/323 |
| 11,216,352 B2 * | 1/2022 | Park | G06F 11/3006 |
| 2012/0137273 A1 * | 5/2012 | Meijler | G06F 11/3476 717/128 |
| 2012/0260135 A1 * | 10/2012 | Beck | G06F 11/323 714/E11.181 |

(Continued)

OTHER PUBLICATIONS

Han et al., "Performance Debugging in the Large via Mining Millions of Stack Traces", published by IEEE, ICSE 2012, Zurich, Switzerland, pp. 145-155 (Year: 2012).*

(Continued)

*Primary Examiner* — S. Sough
*Assistant Examiner* — Zheng Wei
(74) *Attorney, Agent, or Firm* — Kilpatrick Townsend & Stockton LLP

(57) ABSTRACT

Described are systems, methods, and techniques profiled call stack linking. Data relating to functions that are part of call stacks can be captured from a series of snapshots. Frame information for the identified functions (e.g., a span ID, trace ID) can be identified and indexed. Responsive to receiving a query for a visualization specifying one or more criteria (e.g., all frames that are part of a span), all frames corresponding with the criteria can be identified. An action can be performed using the identified frames, such as generating a visualization of the identified frames for use in deriving insights into the functions being executed as part of a call stack.

15 Claims, 14 Drawing Sheets

(56) References Cited

U.S. PATENT DOCUMENTS

| | | | | |
|---|---|---|---|---|
| 2014/0229919 | A1* | 8/2014 | Spiridonov | G06F 11/34 |
| | | | | 717/125 |
| 2019/0042143 | A1* | 2/2019 | Trika | G06F 11/323 |
| 2019/0098106 | A1* | 3/2019 | Mungel | H04L 67/564 |
| 2019/0391902 | A1* | 12/2019 | Oka | G06F 11/3608 |
| 2021/0149787 | A1* | 5/2021 | Nguyen | G06F 11/3636 |
| 2021/0157924 | A1* | 5/2021 | Antoniadis | G06F 11/3612 |
| 2022/0067990 | A1* | 3/2022 | Sato | G06T 11/206 |

OTHER PUBLICATIONS

Trumper et al., "Understanding Complex Multithreaded Software Systems by Using Trace Visualization", published by ACM, SOFTVIS'10, Oct. 25-26, 2010, Salt Lake City, Utah, USA, pp. 133-142 (Year: 2010).*
Splunk Enterprise 8.0.0 Overview, available online, retrieved May 20, 2020 from docs.splunk.com, p. 1-17.
Splunk Cloud 8.0.2004 User Manual, available online, retrieved May 20, 2020 from docs.splunk.com, p . 1-66.
Splunk Quick Reference Guide, updated 2019, available online at https://www.splunk.com/pdfs/solution-guides/splunk-quick-reference-guide.pdf, retrieved May 20, 2020, p. 1-6.
Carraso, David, "Exploring Splunk," published by CITO Research, New York, NY, Apr. 2012, p. 1-155.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

Flamegraph 400

| Frame 1 | | | | |
|---|---|---|---|---|
| | | | Frame 2 | Frame 3 | Frame 4 |
| | | | Frame 8 | Frame 9 | Frame 10 |
| | | | Frame 14 | Frame 15 | Frame 16 |
| | | | Frame 21 | Frame 22 | |
| | | | | Frame 27 | |

Frame 5 | Frame 6 | Frame 7
Frame 11 | Frame 12 | Frame 13
Frame 17 | Frame 18 | Frame 19 | Frame 20
Frame 23 | Frame 24 | Frame 25 | Frame 26
Frame 28 | Frame 29 | Frame 30 | Frame 31 | Frame 32
Frame 33 | Frame 34 | Frame 35 | Frame 36 | Frame 37
Frame 38 | Frame 39 | Frame 40
Frame 41

FIG. 4

| Frame 1 (Span A) (Trace 1) | Frame 2 (Span B) (Trace 1) | Frame 3 (Span A) (Trace 1) | Frame 4 (Span C) (Trace 2) | Frame 5 (Span B) (Trace 1) | Frame 6 (Span C) (Trace 2) | Frame 7 (Span C) (Trace 2) | Frame 8 (Span A) (Trace 1) | Frame 9 (Span B) (Trace 1) | Frame 10 (Span C) (Trace 2) | Frame 11 (Span B) (Trace 1) | Frame 12 (Span A) (Trace 1) |
|---|---|---|---|---|---|---|---|---|---|---|---|

Frame 1 (Span A) (Trace 1)
Frame 2 (Span B) (Trace 1)
Frame 3 (Span A) (Trace 1)
Frame 5 (Span B) (Trace 1)
Frame 8 (Span A) (Trace 1)
Frame 9 (Span B) (Trace 1)
Frame 11 (Span B) (Trace 1)
Frame 12 (Span A) (Trace 1)

602 → Service: Operation

> birdlympics-v0ll-2: /register/bird/{id}    2.53s
>> birdlympics-v0ll-2: RegistrationController.bird    2.53s

| | |
|---|---|
| Service | birdlympics-v0ll-2 |
| Operation | RegistrationController.bird |
| 604 → Span ID | 73d5b2f02281a1 |
| 606 → Parent ID | c800e40faf5a53f |
| 608 → Time (Start - End) | 2021-09-27T15:04:38.380948 - 2021-09-27T15:04:40.920000 |
| Duration | 2.53s |
| Relative Start | +167µs |

Tags

| | |
|---|---|
| otel.library.name | "io.opentelemetry.spring-webmvc-3.1" |
| otel.library.version | "splunk-1.4.0-otel-1.6.0" |
| span.kind | "internal" |
| 610 → thread.id | 36 |
| thread.name | "http-nio-8080-exec-5" |

Process

| | |
|---|---|
| container.id | "41c2f52cde56a716e1ea818df82688b1b0e4df2a214133f21147954864 de1e274" |
| environment | "demo" |
| host.arch | "amd64" |
| host.name | "41c2f52cde56" |
| os.description | "Linux 5.10.47-linuxkit" |
| os.type | "linux" |
| process.command_line | "/opt/java/openjdk/bin/java -Dotel.exporter.otlp.endpoint=http://collector:4317 -Dotel.resource.attributes=environment=demo -Dotel.service.name=birdlympics-v0ll-2 -Dsplunk.profiler.enabled=true -javaagent:splunk-otel-javaagent-all.jar -Dfile.encoding=UTF-8 -Duser.country=US -Duser.language=en -Duser.variant" |
| process.executable.path | "/opt/java/openjdk/bin/java" |

FIG. 6B

CODE PROFILING CALL STACK LINKING

RELATED APPLICATIONS

This application claims priority to U.S. Provisional Patent Application No. 63/256,920, titled "CODE PROFILING CALL STACK LINKING," and filed Oct. 18, 2021, the entirety of which is incorporated by reference herein for all purposes.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or may be generated based on parameters associated with a computing system on which the software is operating. For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics in a computing environment, such as data related to processor usage or memory usage, in real-time to allow for identification of any problems as they occur in the computing environment. Machine data can be tracked in real-time or over various time periods (e.g., hours, days, weeks, months) and this allows for identification of patterns, which can be useful for various purposes such as scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

BRIEF DESCRIPTION OF THE DRAWINGS

Illustrative examples are described in detail below with reference to the following figures:

FIG. 4 illustrates an example flamegraph.

FIG. 5A is an illustration of a visualization of frames associated with a span and/or a trace.

FIG. 5B is an illustration of a visualization of frames associated with spans of a specified trace.

FIG. 6B illustrates an example of a first portion of an interface.

DETAILED DESCRIPTION

Figure 1:
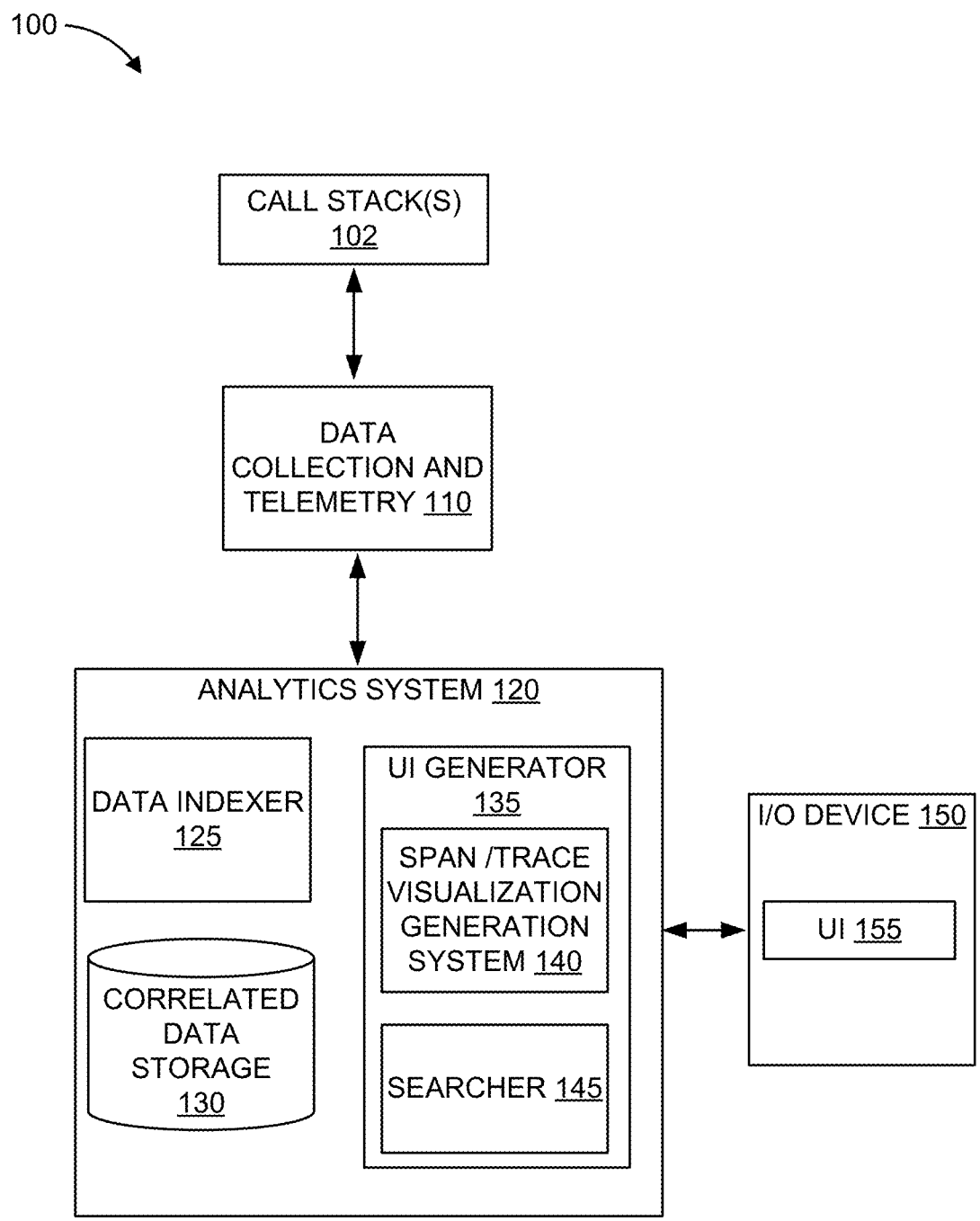
FIG. 1 is a block diagram of a system for code profiling on a call stack.

The present disclosure relates to monitoring the performance of a computer system or computing environment based upon call stack data. Techniques are described for performing code profiling of functions in a call stack. Data relating to a number of functions being executed as part of one or more call stacks can be captured as part of one or more snapshots taken during a time duration. The data captured for each snapshot can include data relating to one or more functions part of one or more call stacks that are executing at the time when each snapshot is taken. The data captured in a snapshot for a function can include information related to a span (identified by a span ID) and a trace (identified by trace ID) for the function. The span ID and trace ID data captured for a function, potentially across multiple call stack snapshots, can be indexed and stored for subsequent retrieval responsive to a query. One or more visualizations can be used to output the data captured regarding the functions over a series of snapshots over a time duration. For example, a visualization, referred to herein as a "flamegraph," can be generated and output to a user.

Further, the system can, in response to a query specifying certain search criteria (e.g., a combination of one or more of a period of time, a series of snapshots, functions names, span IDs, trace IDs, etc.), the stored and indexed snapshots information can be processed to retrieve function-related data that satisfies the query criteria. The retrieved information can be used to generate a visualization (or multiple visualizations) to visualize the retrieved information. The visualization(s) generated can provide information about functions and related spans and/or traces, which can be used for various different purposes. For example, the visualization(s) can help identify functions that are part of a specific span, identifying a function being executed for an extended duration of time, and the like.

An example embodiment provides a computer-implemented method. The method can include capturing data relating to a plurality of functions from a series of snapshots during a time duration. Each of the plurality of functions can relate to an operation executed as part of a call stack. The method can also include receiving, for each of the plurality of functions, function information including both a span ID specifying any span associated with each function and a trace ID specifying any trace associated with each function. The method can also include indexing function information for each of the plurality of functions by span ID and trace ID. The method can also include receiving a selection of a query specifying one or more criteria relating to a span and/or a trace for a specified function and identifying all functions that correspond with the one or more criteria.

In some instances, the computer-implemented method can include causing display of a first visualization visually representing the plurality of functions. Each of the identified functions can be represented as frames in the first visualization. Further, a size of each frames displayed in the first visualization is based on a number of identified instances of each of the plurality of functions during the time duration. The first visualization can include a flamegraph as described herein. In some instances, each frame can be arranged on the first visualization based on a depth of each function on corresponding call stacks. In some instances, the receiving of the selection of the query is responsive to obtaining a selection of a first frame on the first visualization. The one or more criteria can specify all functions that are part of a first span corresponding with the first frame.

The method can also include performing an action based on the identified functions that correspond with the one or more criteria. In some instances, performing the action can include generating a second visualization illustrating the identified functions that correspond with the one or more criteria. In some instances, the second visualization can specify each function that is part of a specified span as included in the one or more criteria, with each function represented in the second visualization as a corresponding frame. In some instances, the computer-implemented method can include obtaining a selection of a frame in the second visualization and causing display of a third visualization providing a stack trace providing details relating to a snapshot in which a function corresponding with the selected frame was identified according to a trace ID associated with the selected frame.

Another exemplary embodiment relates to a computing device. The computing device a processor and a non-transitory computer-readable medium. The computer-readable medium can have stored thereon instructions that, when executed by the processor, cause the processor to capture data relating to a plurality of functions from a series of snapshots during a time duration. Each of the plurality of functions can relate to an operation executed as part of a call stack. The instructions can further cause the processor to receive, for each of the plurality of functions, function information including both a span ID specifying any span associated with each function and a trace ID specifying any trace associated with each function. The instructions can further cause the processor to index the function information for each of the plurality of functions by span ID and trace ID.

The instructions can further cause the processor to cause display of a first visualization of the plurality of functions captured from the series of snapshots during the time duration. Each of the plurality of functions can be represented as a frame. In some instances, a size of each frame displayed in the first visualization is based on a number of identified instances of each corresponding function during the time duration. In some instances, each frame is arranged in the first visualization based on a depth of each corresponding function on corresponding call stacks. In some instances, first visualization can include a flamegraph.

The instructions can further cause the processor to obtain a selection of a first frame displayed in the first visualization. The first frame can correspond with a first function that is part of a first span. The instructions can further cause the processor to identify all functions that include a span identifier for the first span from the indexed function information. The instructions can further cause the processor to cause display of a second visualization providing all identified frames with the span identifier for the first span. In some instances, the identified frames in the second visualization are arranged according to trace identifiers specifying snapshots in which each function is detected during the time duration. In some instances, the instructions further cause the processor to obtain a selection of a second frame included in the second visualization and cause display of a third visualization providing a stack trace providing details relating to a snapshot in which the second frame was identified according to a trace ID associated with the second frame.

Another exemplary embodiment relates to a non-transitory computer-readable medium. The non-transitory computer-readable medium can have stored thereon instructions that, when executed by one or more processors, cause the one or more processor to perform a process. The process can include capturing data relating to a plurality of functions from a series of snapshots during a time duration. Each of the plurality of functions can relate to an operation executed as part of a call stack. The process can also include receiving, for each of the plurality of functions. The function information can include both a span ID specifying any span associated with each function and a trace ID specifying any trace associated with each function. The process can also include indexing function information for each of the plurality of functions by span ID and trace ID.

The process can also include causing display of a first visualization visually representing the plurality of functions. Each of the plurality of functions are represented as frames in the first visualization. In some instances, a size of each frame displayed on the first visualization is based on a number of identified instances of each of the plurality of functions during the time duration. In some instances, each frame is arranged in the first visualization based on a depth of each frame on corresponding call stacks. In some instances, the selection of the first frame represents a query to identify functions with a common span and/or trace as the first frame.

The process can also include receiving a selection of a first frame in the first visualization. The process can also include identifying all functions that include a span and/or a trace that corresponds with the first frame. The process can also include performing an action based on the identified functions that include the span and/or trace that corresponds with the first frame. In some instances, performing the action includes generating a second visualization identifying all functions that include the span and/or trace that corresponds with the first frame. In some instances, the second visualization specifies each function part of a span that corresponds with the first frame. Each function can be represented in the second visualization as a corresponding frame. In some instances, the process further comprises obtaining a selection of a second frame in the second visualization and causing display of a third visualization providing a stack trace providing details relating to a snapshot in which the second frame was identified according to a trace ID associated with the second frame.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to monitoring the performance of a computer system or computing environment based upon call stack data. Techniques are described for performing code profiling of functions in a call stack. Data relating to a number of functions being executed as part of one or more call stacks can be captured as part of one or more snapshots taken during a time duration. The data captured for each snapshot can include data relating to one or more functions part of one or more call stacks that are executing at the time when each snapshot is taken. The data captured in a snapshot for a function can include information related to a span (identified by a span ID) and a trace (identified by trace ID) for the function. The span ID and trace ID data captured for a function, potentially across multiple call stack snapshots, can be indexed and stored for subsequent retrieval responsive to a query. One or more visualizations can be used to output the data captured regarding the functions over a series of snapshots over a time duration. For example, a visualization, referred to herein as a "flamegraph," can be generated and output to a user.

Further, the system can, in response to a query specifying certain search criteria (e.g., a combination of one or more of a period of time, a series of snapshots, functions names, span IDs, trace IDs, etc.), use the stored and indexed snapshots information to retrieve function-related data that satisfies the query criteria. The retrieved information can be used to generate a visualization (or multiple visualizations) to visualize the retrieved information. The visualization(s) generated can provide information about functions and related spans and/or traces, which can be used for various different purposes. For example, the visualization(s) can help identify functions that are part of a specific span, identifying a function being executed for an extended duration of time, and the like.

A computing environment can comprise one or more computing systems. A computing system can execute one or multiple programs (also referred to as routines or process threads). A program that is being executed by a computer system can be referred to as an active program. During its execution, a program can call or invoke one or more functions (also referred to as subroutines or methods). A function is typically a unit of code that performs a particular set of one or more tasks. During the execution of a program, a function may be called when the particular set of tasks is to be performed. A function can call or invoke other functions. Accordingly, functions can be called in a nested manner, with a first function being called, the first function calling a second function, the second function calling a third function, and so on. Recursion is a special type of nesting where a function calls itself. A function that is being executed by a computer system (i.e., whose execution is not completed) is referred to as an active function.

A call stack is a data structure associated with a computer program and is used to store data or information about the active functions being executed as part of execution of a computer program. A purpose of the call stack is to keep active functions, and for each active function, to keep track of a point in the code to which the active function should return control when it finishes executing. When a function is called, a stack frame corresponding to the function is pushed or added onto the call stack. For example, when with a first function is called, a stack frame corresponding to the first function is pushed onto the call stack. If the first function calls a second function, a second stack frame is pushed onto the call stack. If the second function calls a third function, a third stack frame is pushed onto the call stack, and so one. When a function finishes execution, the stack frame corresponding to the function, and which was previously pushed onto the call stack when the function was called, is popped or removed from the call stack. For example, when the third function finishes execution, the third stack frame corresponding to the third function is popped or removed from the call stack. When the second function finishes execution, the second stack frame corresponding to the second function is popped or removed from the call stack. When the first function finishes execution, the first stack frame corresponding to the first function is popped from the call stack. The call stack thus contains a stack of stack frames corresponding to active functions. The stack frames are arranged or stacked in an order in which the corresponding functions are called or invoked.

In certain implementations, the information or data stored in a stack frame for a function comprises information about local variables in the function, if any, passed to the function, information about the caller or the entity that called the function (e.g., information about the caller's stack frame), and a return address indicative of a location in the code where the function returns after it has completed execution. This location is typically a location somewhere in the caller's code.

The present disclosure describes improved techniques for monitoring programs and associated functions being executed by a computing system or a computing environment. These improved techniques are based upon call stack information captured for the various programs executed by a computer system. This is also referred to as performing code profiling of functions using call stack data.

In certain implementations, for a computing system, a series of snapshots of call stacks corresponding to programs executed by the computer system are captured over a period of time. For a call stack corresponding to a particular program, a series of snapshots of the call stack are captured. Such series of call stacks may be captured for different programs executed by the computer system. The data captured for a call stack snapshot can include data relating to one or more active functions being executed by the computer system when the snapshot was captured.

The data captured in a snapshot for a function can include information about local variables in the function, arguments, if any, passed to the function, information about the caller or the entity that called the function (e.g., information about the caller's stack frame), and a return address indicative of a location in the code where the function returns after it has completed execution. Additionally, the captured call stack data for a function includes information related to a span (identified by a span ID) and a trace (identified by trace ID) specific to each function. The captured call stack data, including the span ID and trace ID data captured for a function, potentially across multiple call stack snapshots, can be indexed and stored for subsequent retrieval.

As noted above, functions identified during a series of snapshots can be associated with a span and/or a trace. A trace can include a collection of operations that represents a unique transaction handled by an application and its constituent services. A span can include a single operation within a trace. Viewing functions based on a span/trace can assist in pinpointing where failures occur and what causes poor performance. Distributed tracing, as the name implies, can deal with tracing user requests through applications that are distributed. A trace can represent a single user request and can represent the entire lifecycle of a request as it moves across the various services or components of a distributed system. The relationship between functions that are part of a span and/or a trace is described in greater detail with respect to FIG. 2A and FIG. 2B.

The call stack data can be captured over a period of time and can include a series of snapshots captured for each of multiple call stacks corresponding to different programs executed by the computer system. This captured data can then be made available for monitoring and analysis of computer system performance. For example, in certain use cases, one or more visualizations can be generated based upon the captured call stack data and output to a user, where the user can use the visualizations to assess system performance. One example of such a visualization is a flamegraph. For example, the analysis system can receive a query from a user identifying certain query criteria. Examples of query criteria include a combination of one or more of: a period of time, a series of snapshots, functions names, span IDs, trace IDs, etc. The analysis system can then, based upon the captured call stack snapshots, retrieve functions-related data that satisfies the query criteria. One or more visualizations can then be generated based upon the retrieved data and output to the user. The visualization(s) that are generated can provide information about functions and related spans and traces, which can be used for various different purposes. For example, the visualization(s) can help identify functions that are repeatedly called as part of a span, identify a function being executed for an extended duration of time, identify functions that are adversely impacting system performance by monopolizing a large percentage of system resources over an extended period of time, and the like. The visualizations thus can assist a user to optimize the execution of programs and functions in the computing environment.

An example of search criteria that is part of a query can include a request to generate a visualization illustrating functions (represented as frames) that are part of a specific span. Another example of search criteria that are provided as part of a query can include a request to provide a visualization of functions that are part of a specified trace. The search criteria can be provided based on interacting with a visualization (e.g., selecting a specific frame on a flamegraph). The system as described herein can retrieve all function-related data that correspond to specified criteria for a query and can generate a visualization based on the identified frame. The visualization(s) generated in response to the query can provide further insights into the functions as part of the call stack, such as identifying functions being repeatedly called as part of a span or a function being executed for an extended duration of time.

Flamegraphs are a visualization of hierarchical data, created to visualize stack traces of profiled software so that the most frequent code-paths can be identified quickly and accurately. The x-axis shows the stack profile population, sorted alphabetically, and the y-axis shows stack depth, counting from zero at the bottom. Each rectangle can represent a frame. The wider a frame is, the more often it was present in the stacks. The top edge can show what is on-CPU, and beneath it is its ancestry.

The flamegraph can provide a visual representation of functions being executed as part of a call stack. In the visual representation, a size of a frame (representing each function) on the x-axis of a flamegraph can be based on a number of identified instances of the function over a time duration or a time each function is being executed on any computing instances, for example. A y-axis of the flamegraph can represent a depth of each frame in the call stack, visualizing an origin of each function call.

As noted above, a flamegraph provides a visualization of a call stack and a depth of the functions called during a time duration. However, a flamegraph may generally not show any links between frames that are part of a span and/or a trace. Accordingly, a flamegraph view of a call stack may not provide some insights into the processing of the function as part of the call stack and may increase difficulty in optimizing the functions in the call stack.

The present embodiments relate to code profiling of functions in a call stack. Data relating to function being executing during a series of snapshots, such as a span ID and a trace ID for each function, can be captured. The span ID and trace ID for a function can be indexed and stored for subsequent retrieval as part of a query. The functions identified during the series of snapshots over a time duration can be visualized in a flamegraph. An example query can include a request to generate a visualization of all call stacks as are part of a span corresponding with a selected frame on the flamegraph. Another example query can include a request to provide a visualization of all call stacks as are part of a specified trace. The system as described herein can retrieve all function that correspond to specified criteria for a query and can generate a visualization based on the identified frame. The visualization(s) generated as part of a query relating to a span/trace can provide further insights into the functions as part of the call stack, such as identifying functions being repeatedly called as part of a span or a function being executed for an extended duration of time.

1.0. System Overview

As described above, data relating to functions being executed over a time duration can be captured and used to generate one or more visualizations. FIG. 1 is a block diagram of a system 100 for code profiling on a call stack.

As shown in FIG. 1, the system 100 can include a data collection and telemetry system 110. The data collection and telemetry system 110 can capture a series of snapshots over one or more computing instances at a time instance. For instance, for a 15 minute time duration, a snapshot can be performed every minute or every second. The data collection and telemetry system 110 can capture snapshots of the one or more call stacks 102 at the specified time interval. Further, the data collection and telemetry system 110 can identify a span and/or a trace associated with each identified function.

The analytics system 120 can obtain the collected data relating to the series of snapshots. For example, a data indexer 125 can index the collected data by assigning a span identifier (span ID) and a trace identifier (trace ID) corresponding to each function identified by the data collection and telemetry system 110. Further, the data indexer 125 can specify each snapshot in which a function was identified and a timestamp that the snapshot was taken. The indexed data by data indexer 125 can be stored at a correlated data storage 130.

The analytics system 120 can also include a user interface (UI) generator 135. The UI generator 135 can generate and cause display of one or more visualizations of the indexed data. For example, the UI generator 135 can generate a flamegraph providing a representation of all functions being executed as a function of time and a depth of each function on the call stack. The UI generator 135 can also provide visualizations of given functions based on a span ID and/or a trace ID. For example, responsive to a selection of a frame on the flamegraph, a span/trace visualization generation system 140 can receive a request to generate a visualization of all frames that are part of a span corresponding to that of the selected frame. A searcher 145 can search the correlated data storage 130 for all relevant functions that are part of the span, and the span/trace visualization generation system 140 can generate a visualization of the identified functions as a function of time. The UI generator 135 can then cause display of the generated visualization.

An I/O device 150 can include a computer capable of displaying visualizations generated by the UI generator 135.

For example, I/O device 150 can include a client device with a UI 155 allowing interaction with the visualizations by an operator. For example, an operator can interact with UI 155 to generate a query for a visualization of all functions that are part of a span with a selected frame. This request can be passed to UI generator 135 for generation of a visualization as described herein.

2.1 Span and Trace Overview

As described above, functions identified during a series of snapshots can be associated with a span and/or a trace. A trace can include a collection of operations that represents a unique transaction handled by an application and its constituent services. A span can include a single operation within a trace. Viewing functions based on a span/trace can assist in pinpointing where failures occur and what causes poor performance. Distributed tracing, as the name implies, can deal with tracing user requests through applications that are distributed. A trace can represent a single user request and can represent the entire lifecycle of a request as it moves across the various services or components of a distributed system.

Figure 2A:
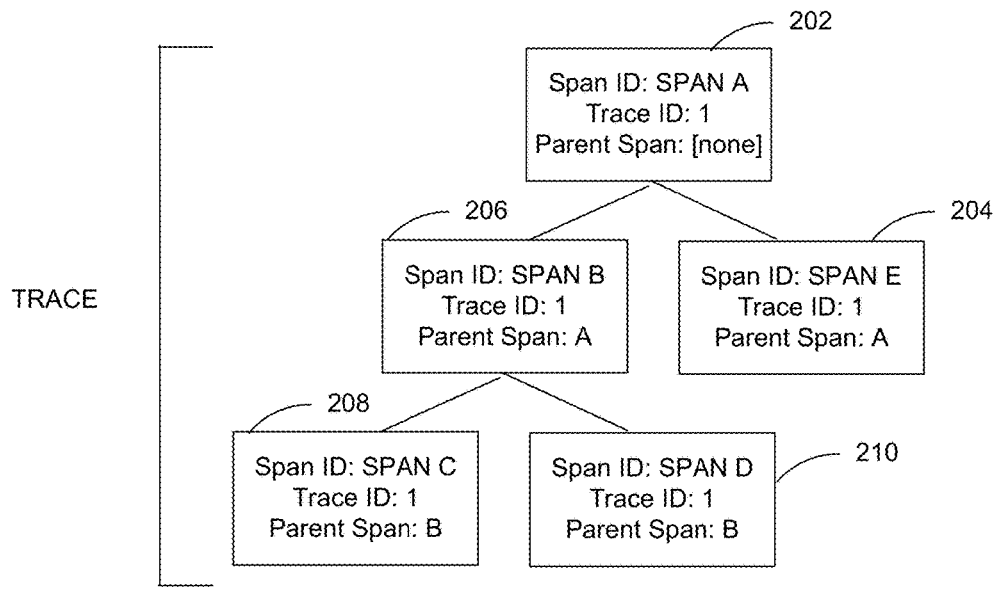
FIG. 2A illustrates an exemplary trace tree.

FIG. 2A illustrates an exemplary trace tree. The first span in the trace tree, Span A 202, can be known as the root span. A trace tree can have a root span, which is a span that does not have a parent. It can be followed by one or more child spans. Child spans can also be nested as deep as the call stack goes. For instance, Span B 206 and Span E 204 are child spans of the parent span, Span A 202. Further, Span C 208 and Span D 210 are child spans of parent Span B 206.

Figure 2B:
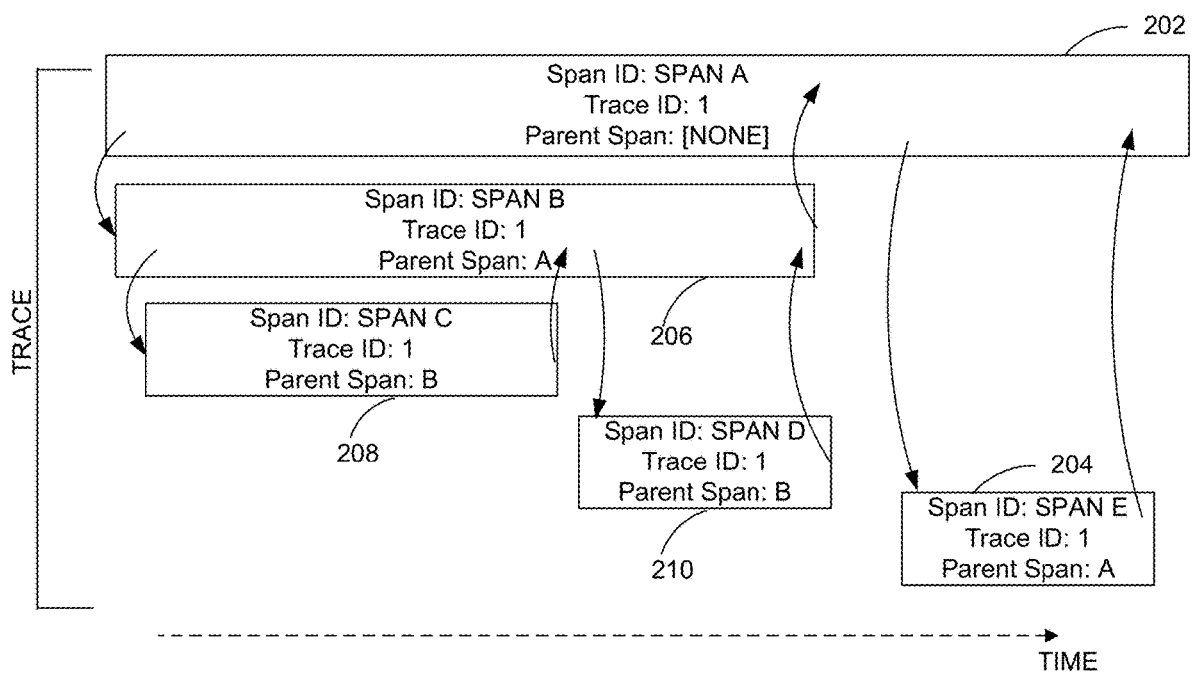
FIG. 2B illustrates an alternate view of the trace from FIG. 2A adjusted for timeline.

FIG. 2B illustrates an alternate view of the trace from FIG. 2A adjusted for timeline. The trace starts with Span A 202, the root span, where the request starts. When the trace starts, a Trace ID can be generated (e.g., Trace ID: 1 as shown in FIG. 2B), which can follow the request as it propagates through the distributed system. A new span can be generated for each logical chunk of work in the request, where the new span includes the same Trace ID, a new Span ID and the Parent Span ID (which points to the span ID of the new span's logical parent). The Parent Span ID creates a parent-child relationship between spans.

A given request can comprise one span (e.g., root Span A 202) for the overall request and a child span for each outbound call made to another service, database, a function within the same microservice, etc. as part of that request. For example, in the example of FIG. 2B, Span A 202 is the root span for the overall request and generates several child spans to service the request. Span A 202 makes a call to Span B 206, which in turn makes a call to Span C 208, which is a child span of Span B 206. Span B 206 also can make a call to Span D 210, which is also a child span of Span B 206. Span A 202 subsequently can call Span E 204, which is a child span of Span A 202. Note, that all the spans in the trace also comprise the same Trace ID. The Trace ID along with the Parent Span ID may be used to consolidate the spans together into a trace.

2.2 Functions Part of a Span Across Multiple Threads

Figure 3A:
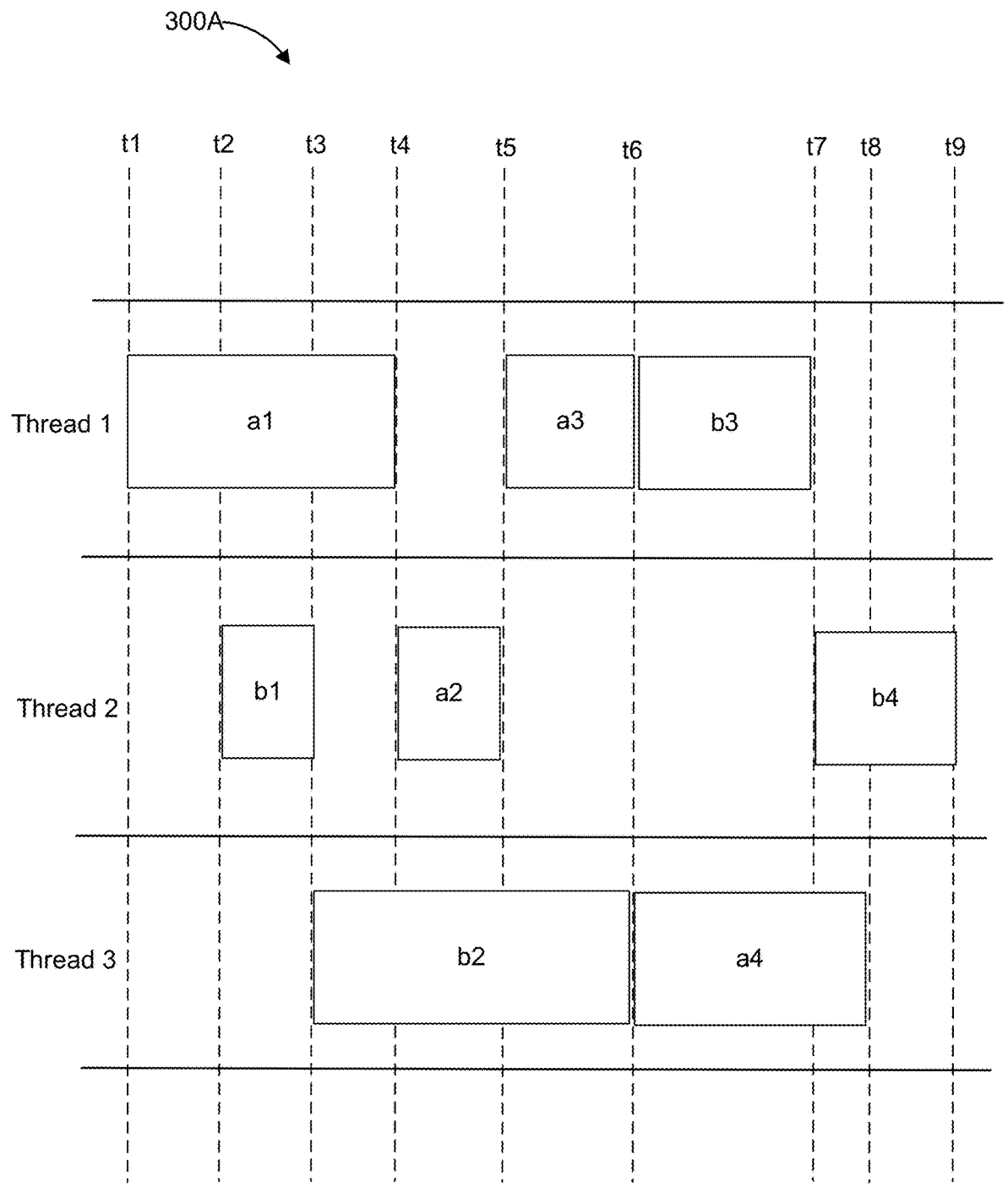
FIG. 3A is a block diagram of a series of functions being performed across multiple threads as part of one or more spans.

In some instances, functions part of a call stack can be performed across multiple computing instances. For example, computing instances can include cores of a processor, virtual machines running on a server computer, a series of interconnected computing devices, etc. Further, functions part of a span can be performed across multiple computing instances (or "threads"). FIG. 3A is a block diagram 300a of a series of functions being performed across multiple threads as part of one or more spans.

As shown in FIG. 3A, multiple functions can be part of a span. For example, a first span comprises functions a1, a2, a3, a4, and a second span comprises functions b1, b2, b3, b4. Each span can include functions divided across multiple threads over time. For example, for a first span, function a1 is performed on thread 1 between time t1 and time t4, while function a2 is performed on thread 2 between time t4 and time t5.

Figure 3B:
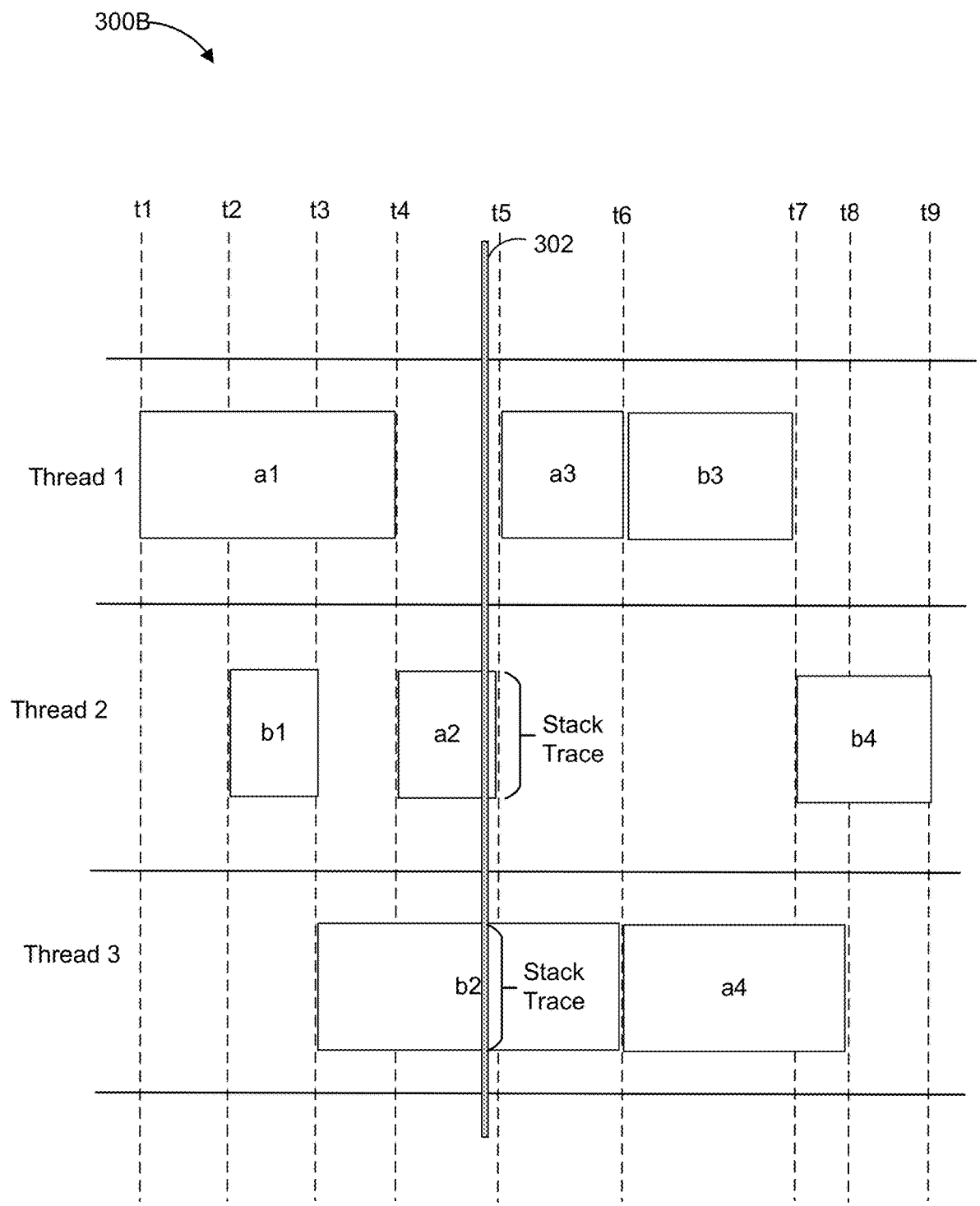
FIG. 3B illustrates is a block diagram of a series of functions being performed across multiple threads as part of one or more spans with a stack trace.

FIG. 3B illustrates is a block diagram 300b of a series of functions being performed across multiple threads as part of one or more spans with a stack trace. As shown in FIG. 3B, a stack trace 302 can be associated with a time instance t5. If a snapshot is taken between time t4 and t5, a data collection and telemetry system can identify function a2 being performed on thread 2 and function b2 being performed on thread 3. Further, data collection and telemetry system can identify that function a2 is part of a first span and function b2 is part of a second span.

2.3 Flamegraph Overview

As described above, a flamegraph can be generated as a visual representation of functions as part of a call stack. A flamegraph can provide a visualization of hierarchical data, created to visualize stack traces of profiled software so that the most frequent code-paths to be identified quickly and accurately. The x-axis can show the stack profile population, and the y-axis can show a stack depth. Each rectangle represents a stack frame. A width of each frame can represent how often that function was present in the captured stacks.

FIG. 4 is an example flamegraph 400. As shown in FIG. 4, the flamegraph 400 can include a series of frames. The frames can be disposed as a function of time, where a depth of each frame is representative of a depth of each frame on the call stack. While the flamegraph 400 can provide a visualization of frames captured during a time duration, the flamegraph 400 may not visualize spans/traces of the identified frames.

2.4 Visualization Generation by Span/Trace

As described above, one or more visualizations can be generated based on queries for specified criteria. For example, a request for a visualization of only frames associated with spans and/or traces can be obtained. In response, a searcher can identify all relevant frames that are part of spans/traces and a visualization can be generated. The query can specify one or more criteria to filter a search and identify specific frames associated with any span/trace.

FIG. 5A is an illustration of a visualization 500A of frames associated with a span and/or a trace. As shown in FIG. 5A, the visualization can include frames associated with a first trace (trace 1) and a second trace (trace 2). For example, frame 1 is associated with span A, which is a part of trace 1. In this example, frame 2 is associated with span B, which also is part of trace 1. Further, frame 4 is associated with span C, which is part of trace 2.

FIG. 5B is an illustration of a visualization 500B of frames associated with spans of a specified trace. As shown in FIG. 5B, the visualization can include frames associated with a single trace (trace 1). For example, frame 1 is associated with span A, which is a part of trace 1. In this example, frame 2 is associated with span B, which also is part of trace 1. Further, frame 4 is associated with span C, which is part of trace 1.

Figure 5C:
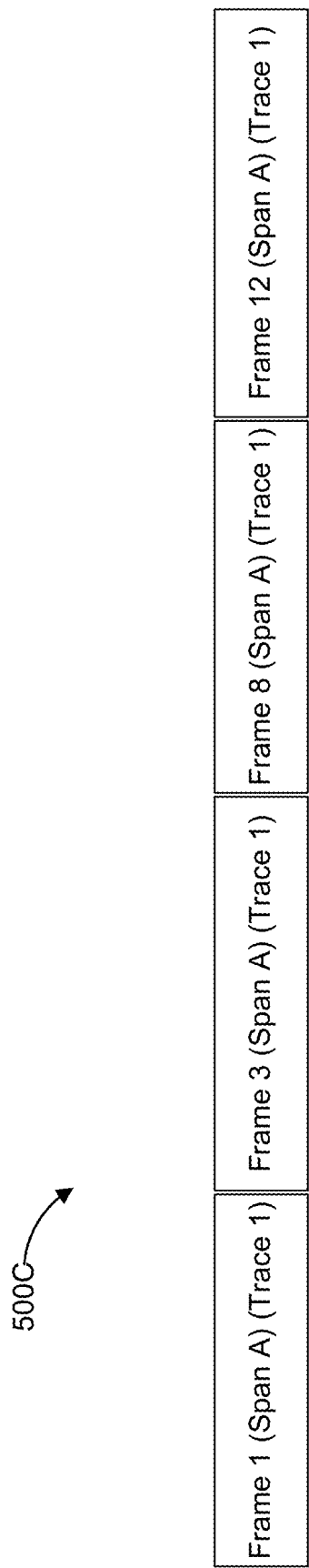
FIG. 5C is an illustration of a visualization of frames associated with a span.

FIG. 5C is an illustration of a visualization 500C of frames associated with a span. For example, in FIG. 5C, the visualization can illustrate frames part of Span A. The varying visualizations can allow for querying various criteria to derive insights into the functions being performed in call stacks. For instance, the search criteria can include functions comprising a trace ID of "Trace 1" and a span ID of "Span A."

2.4 Stack Trace Over View

A stack trace can include a report of an active stack frame at a point in time during the execution of a call stack. The stack trace can provide further details relating to the call stack, such as a thread name of a thread executing a function, a timestamp of a snapshot for the stack trace, and a number of functions executing during the stack trace.

Figure 6A:
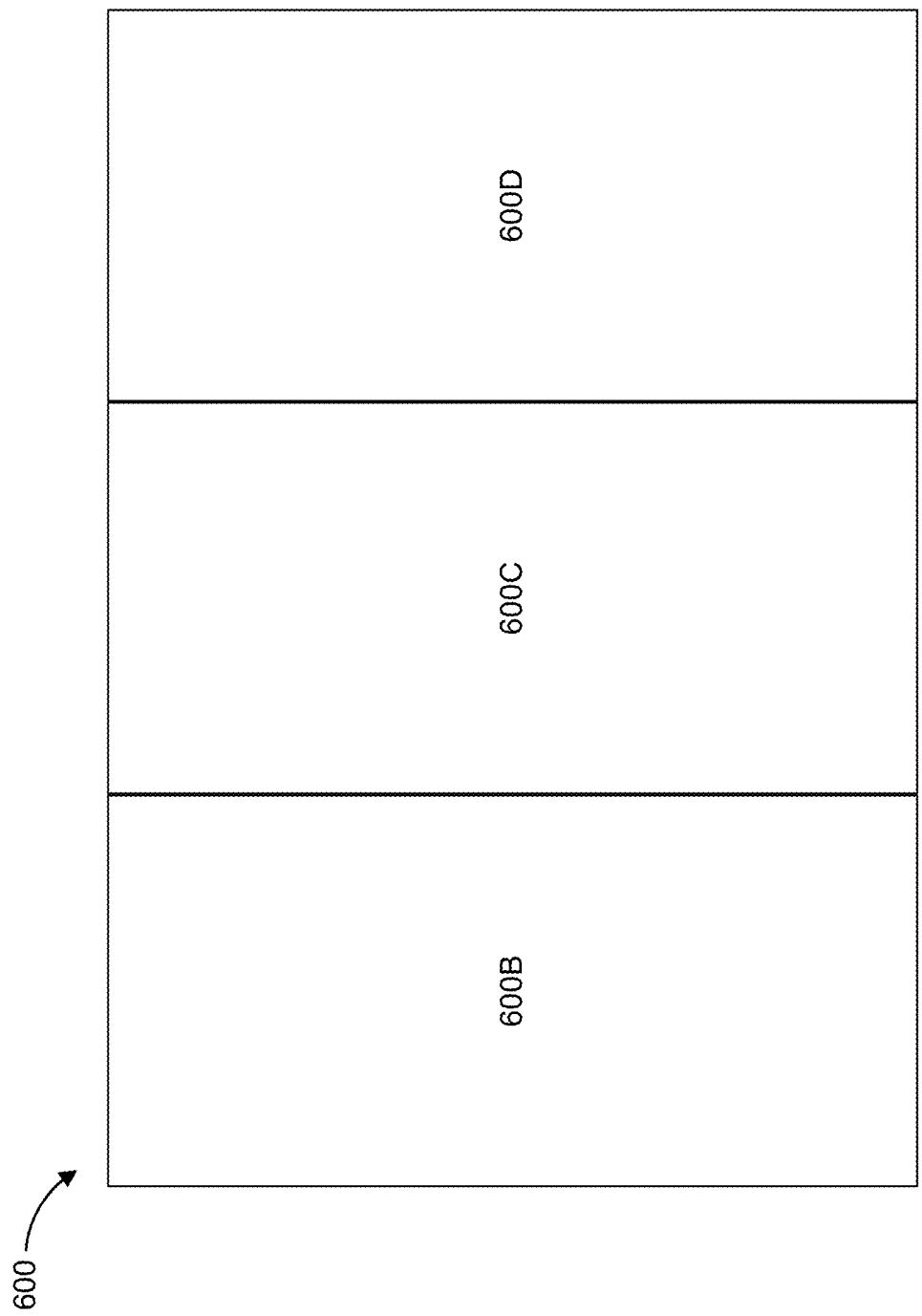
FIG. 6A is an example interface providing various details relating to a stack trace.

FIGS. 6A-6D illustrate an interface 600 depicting details relating to a stack trace. FIG. 6A is an example interface 600 providing various details relating to a stack trace. The interface 600 can include a first portion 600B, second portion 600C, and a third portion 600D. As shown in FIGS. 6A-D, an indication of a timestamp in which the snapshot was taken can be provided, as well as a thread name, a timestamp, and a stack trace of functions executing at the time of the snapshot. The stack trace can show various tags, services, and/or processes to provide greater detail relating to the functions performed at the time of the snapshot.

FIG. 6B illustrates an example of a first portion 600B of interface 600. As shown in FIG. 6B, the first portion 600B can include various details relating to a service and operation 602. The first portion 600B can provide details (e.g., tags, processes) for the service and operation 602. For instance, the first portion 600B can include a span ID 604, a parent span ID 606, a time window 608 in which snapshots are captured, etc. Further, the first portion 600B can provide tags, such as information relating to a thread (e.g., thread ID 610) or processes.

Figure 6C:
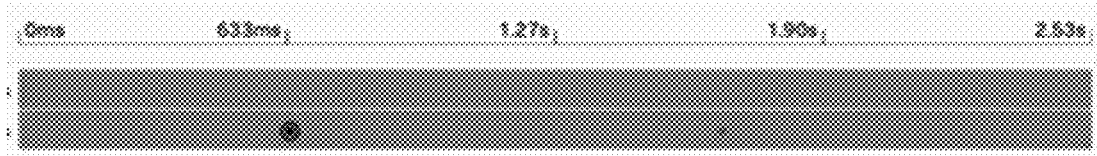
FIG. 6C illustrates an example of a second portion of an interface.

FIG. 6C illustrates an example of a second portion 600C of interface 600. The second portion 600C can include data relating to a stack trace, such as a thread name 612 and a timestamp 614 specifying a time in which the snapshot was taken. The second portion 600C can further include a listing of all functions executing at the time of the snapshot as part of the stack trace 616.

Figure 6D:
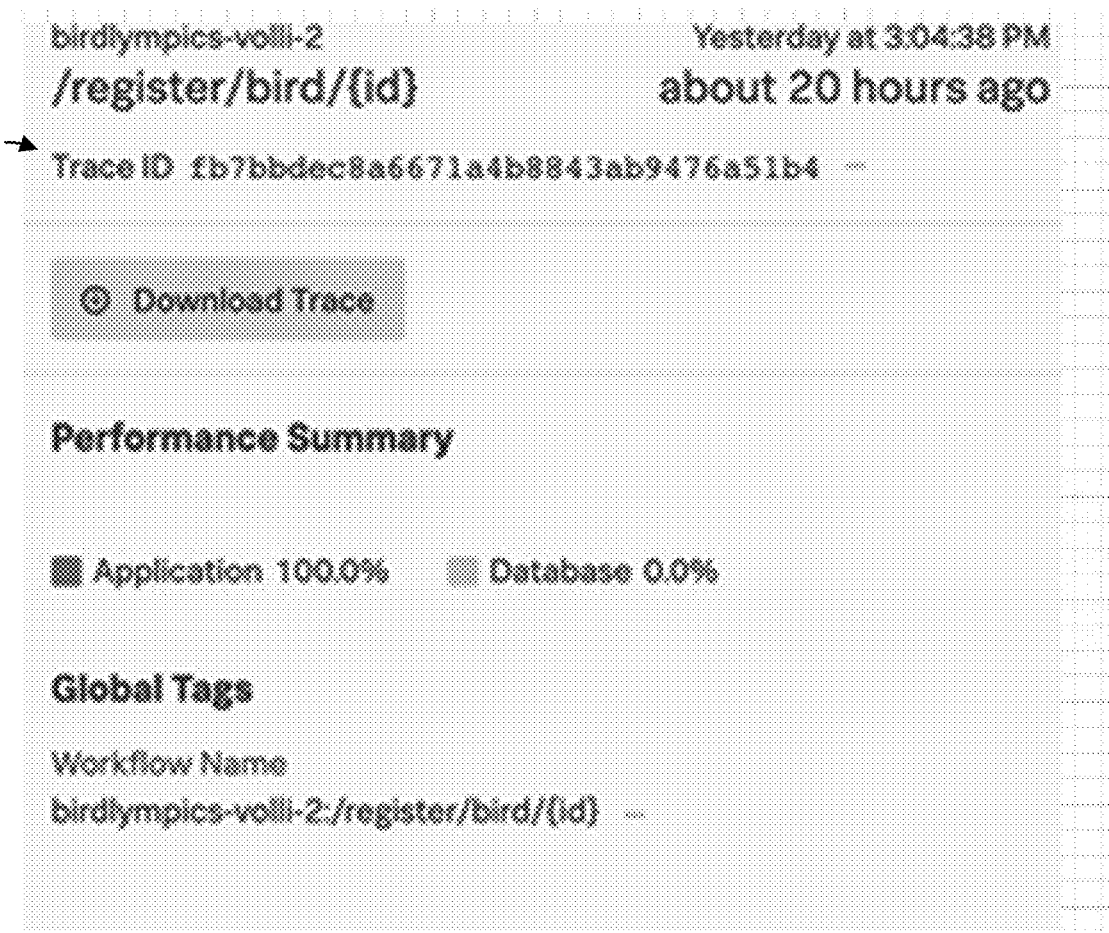
FIG. 6D illustrates an example of a third portion of an interface.

FIG. 6D illustrates an example of a third portion 600D of interface 600. The third portion 600D can include information relating to the operation, such as a trade ID 618 for the operation. The trace information can be downloaded to provide further insights into the stack trace.

It will be appreciated that the arrangement of portions 600A, 600B, and 600C of interface 600 is merely one example, and that various portions of interface 600 and features or details therein can be arranged in any suitable configuration.

3.0 Flamegraph Generation Flow Process

As described above, a flamegraph can be generated to provide a visual representation of functions performed across multiple threads over a time duration. Further, the flamegraph can show a depth of each function as part of the call stack. The flamegraph can provide some insights into the aggregation of call stacks, such as a time duration each frame is being executed by the computing instances.

Figure 7:
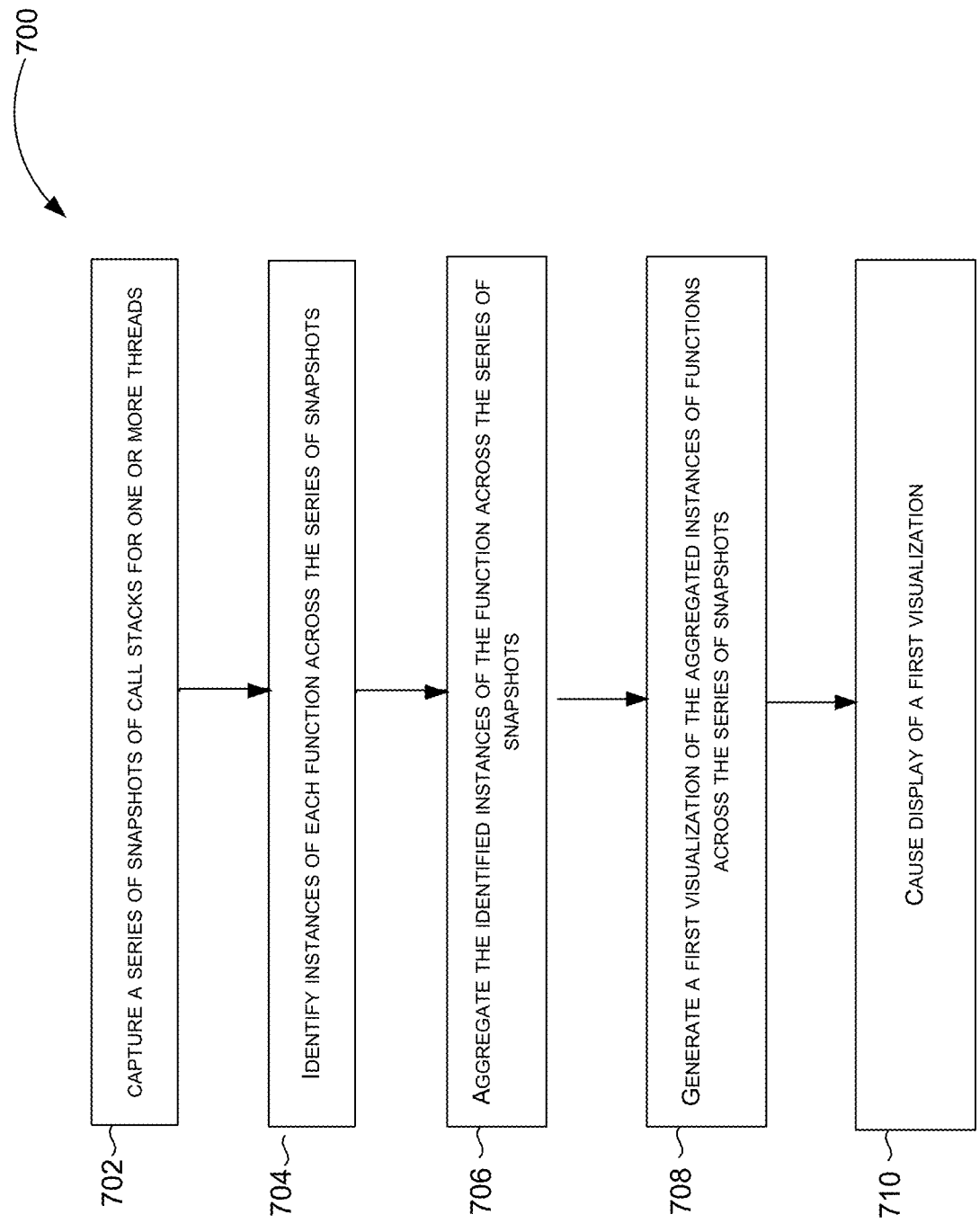
FIG. 7 is a flow process for generating a flamegraph based on identified functions identified from a series of snapshots.

FIG. 7 is a flow process 700 for generating a flamegraph based on identified functions identified from a series of snapshots. At 702, the system can capture a series of snapshots of call stacks for one or more threads. Each snapshot can include capturing functions being executed on each thread. The functions being performed across the threads during the snapshot can be linked via span and/or a trace.

At 704, a number of instances of each function can be identified. For example, for each snapshot, an instance of each function can be identified and associated with a span/trace. The identified instances of each function can provide insights into a duration each function is being executed on the threads.

At 706, the identified instances of the functions can be aggregated. The aggregated instances of each function can be represented in the flamegraph by the width of each frame. For example, a width of the frame for a function can increase as the number of identified instances of that function being executed on the threads increases.

At 708, system can generate a first visualization of the aggregated instances of functions across the series of snapshots. An example of a first visualization can include a flamegraph or other visualization depicting one or more functions that are part of one or more call stacks.

At 710, the system can cause display of the first visualization. The flamegraph can be interacted with by an operator to generate queries for subsequent visualizations based on a span/trace. For example, the operator can select a frame in the flamegraph and request generation of a visualization of frames that are part of a span for the selected frame.

3.1 Span/Trace Visualization Generation Flow Process

Figure 8:
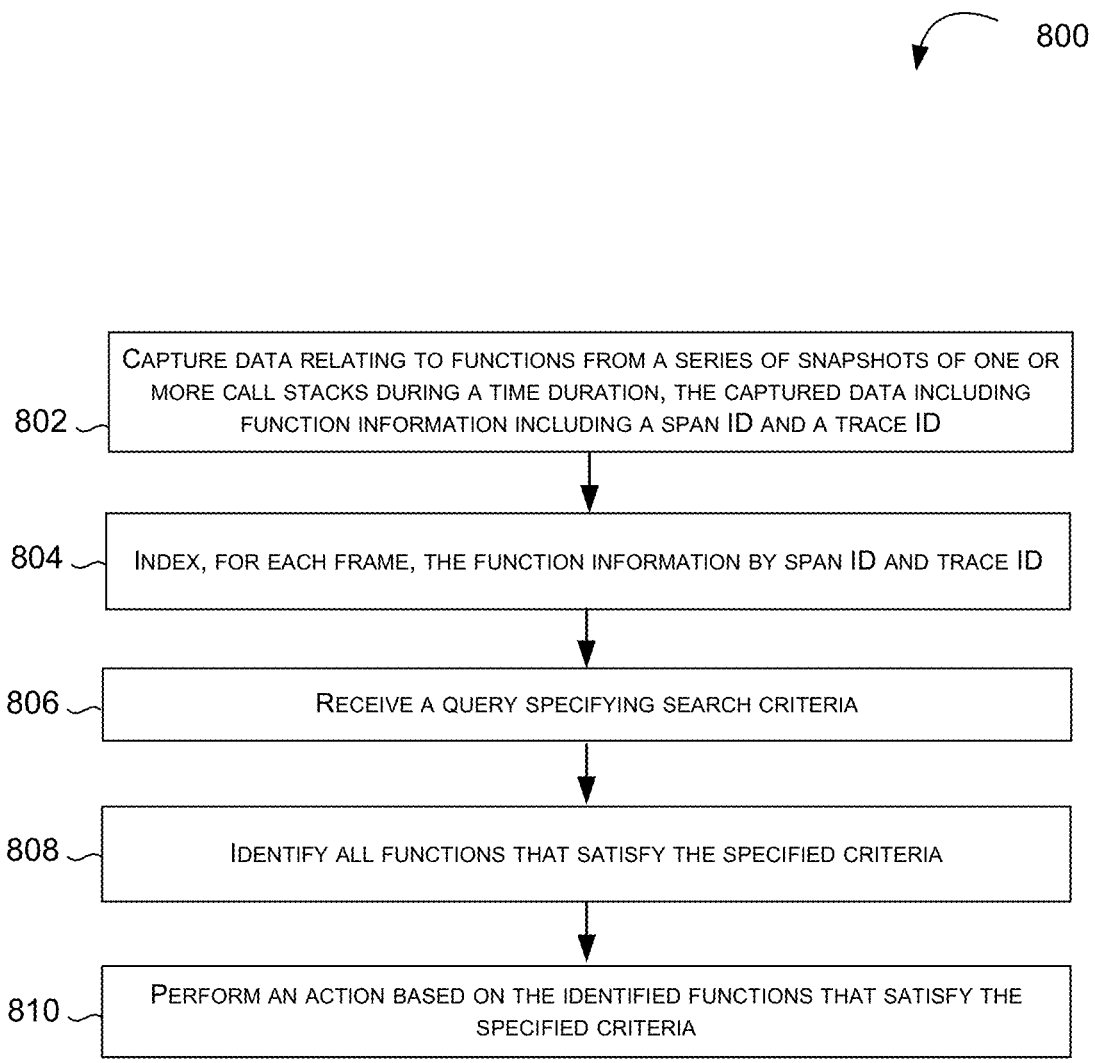
FIG. 8 is a flow process of a method for code profiling of a call stack.

As described above, the present embodiments relate to code profiling for a call stack. Particularly, function information can be obtained for functions captured during a series of snapshots. The function information (e.g., a span ID, trace ID) can be indexed and used for performing an action (e.g., generating visualizations of the functions corresponding with spans and/or traces. FIG. 8 is a flow process of a method 800 for code profiling of a call stack.

At 802, the method can include capturing data relating to a plurality of functions from a series of snapshots of one or more call stacks during a time duration. Each of the plurality of functions can relate to an operation executed as part of a call stack. The captured data can include function information for each of the plurality of functions. The function information can include both a span ID specifying any span associated with each function and a trace ID specifying any trace associated with each function. For example, a data collection and telemetry system can derive a span ID and/or a trace ID for each identified function.

At 804, the method can also include indexing function information for each of the plurality of function by span ID and trace ID. This can include storing the indexed function information in a correlated data storage module. The stored function information can be used in identifying function corresponding with a specified span/trace.

In some instances, the method can include causing display of a first visualization of the plurality of function (with each function illustrated by a corresponding frame) captured from the series of snapshots during the time duration. The first visualization can include a flamegraph. A size of each of the plurality of frames displayed on the first visualization can be based on a number of identified instances of each of the plurality of each corresponding function during the time duration. In some instances, each of the plurality of frames are arranged on the first visualization based on a depth of each corresponding function on corresponding call stacks.

In some instances, the receiving of the selection of the query is responsive to obtaining a selection of a first frame on the first visualization. For example, an operator may desire to view frames that are part of a first span for a function corresponding with the first frame, and the user can select the first frame on the flamegraph. The one or more criteria can specify the functions that are part of a first span corresponding with the first frame. This can cause performance of an action to display a second visualization of the functions that are part of the first span.

At 806, the method can also include receiving a selection of a query specifying search criteria relating to a span and/or a trace for a specified frame. For instance, the search criteria can specify a span and/or a trace to be searched via a searcher.

At 808, the method can also include identifying all functions that satisfy the one or more criteria. For instance, the stored function information can be processed to identify all functions corresponding with a span or a trace.

At 810, the method can include performing an action based on the identified functions that satisfy the one or more criteria. In some instances, performing the action includes generating a second visualization of the query specifying the one or more criteria.

The second visualization can specify each function that is part of a specified span, each function that is part of any span and/or any trace, and/or each function that is part of any span for a single trace.

In some instances, a selection of a frame in the second visualization can be obtained. Further, the third visualization can be displayed providing a stack trace providing details relating to a snapshot in which the selected function was identified according to a trace ID associated with the selected function.

4.0 Example Embodiments

In a first example embodiment, a computing device is provided. The computing device comprises a processor; and a non-transitory computer-readable medium. The non-transitory computer-readable medium can have stored thereon instructions that, when executed by the processor, cause the processor to capture data relating to a plurality of functions from a series of snapshots during a time duration. Each of the plurality of functions can relate to an operation executed as part of a call stack.

The instructions can also cause the processor to receive, for each of the plurality of functions, function information including both a span ID specifying any span associated with each function and a trace ID specifying any trace associated with each function. The function information can be indexed for each of the plurality of functions by span ID and trace ID.

The instructions can also cause the processor to cause display of a first visualization of the plurality of functions captured from the series of snapshots during the time duration. Each of the plurality of functions can be represented as a frame. A selection of a first frame displayed in the first visualization can further be detected. The first frame can correspond with a first function that is part of a first span.

The instructions can also cause the processor to identify all functions that include a span identifier for the first span from the indexed function information and cause display of a second visualization providing all identified frames with the span identifier for the first span.

In some instances, a size of each frame displayed in the first visualization is based on a number of identified instances of each corresponding function during the time duration.

In some instances, each frame is arranged in the first visualization based on a depth of each corresponding function on corresponding call stacks.

In some instances, the first visualization comprises a flamegraph.

In some instances, the identified frames in the second visualization are arranged according to trace identifiers specifying snapshots in which each function is detected during the time duration.

In some instances, the instructions further cause the processor to obtain a selection of a second frame included in the second visualization and cause display of a third visualization providing a stack trace providing details relating to a snapshot in which the second frame was identified according to a trace ID associated with the second frame.

Another example embodiment relates to a non-transitory computer-readable medium. The non-transitory computer-readable medium can have stored thereon instructions that, when executed by one or more processors, cause the one or more processor to perform a process. The process can include capturing data relating to a plurality of functions from a series of snapshots during a time duration. Each of the plurality of functions can relate to an operation executed as part of a call stack. The process can also include receiving, for each of the plurality of functions, function information including both a span ID specifying any span associated with each function and a trace ID specifying any trace associated with each function.

The process can also include indexing function information for each of the plurality of functions by span ID and trace ID. The process can also include causing display of a first visualization visually representing the plurality of functions. Each of the plurality of functions can be represented as frames in the first visualization.

The process can also include receiving a selection of a first frame in the first visualization. The process can also include identifying all functions that include a span and/or a trace that corresponds with the first frame. The process can also include performing an action based on the identified functions that include the span and/or trace that corresponds with the first frame.

In some instances, a size of each frame displayed on the first visualization is based on a number of identified instances of each of the plurality of functions during the time duration.

In some instances, each frame is arranged in the first visualization based on a depth of each frame on corresponding call stacks.

In some instances, the selection of the first frame represents a query to identify functions with a common span and/or trace as the first frame.

In some instances, performing the action includes generating a second visualization identifying all functions that include the span and/or trace that corresponds with the first frame.

In some instances, the second visualization specifies each function part of a span that corresponds with the first frame, with each function represented in the second visualization as a corresponding frame.

In some instances, the process further comprises obtaining a selection of a second frame in the second visualization and causing display of a third visualization providing a stack trace providing details relating to a snapshot in which the second frame was identified according to a trace ID associated with the second frame.

5.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
    capturing, from a series of snapshots of one or more call stacks during a time duration, data relating to a plurality of functions executed in the time duration;
    receiving, for each of the plurality of functions, function information specifying a span associated with the function and a trace associated with the function;
    indexing the data relating to the plurality of functions by the span and the trace associated with each function in the plurality of functions;
    receiving a query specifying one or more criteria relating to at least one of a span or a trace;
    identifying a set of one or more functions, from the plurality of functions, that correspond to the one or more criteria; and
    performing one or more actions based on the identified set of one or more functions, wherein the performing the one or more actions comprises causing a first visualization to be displayed in response to the received query, the first visualization including a frame for at least one function in the set of one or more functions, wherein a size of a frame displayed is based on a number of identified instances of the at least one function executed during the time duration.

2. The computer-implemented method of claim 1, wherein, for each function in the set of one or more functions, a frame corresponding to the function is displayed in a position in the first visualization based on a depth of the function in a call stack corresponding to the plurality of functions executed in the time duration.

3. The computer-implemented method of claim 1, wherein the receiving the query is responsive to obtaining a selection of a first frame on the first visualization, and wherein the one or more criteria specify all functions that are part of a first span corresponding with the first frame.

4. The computer-implemented method of claim 1, wherein performing the one or more actions includes generating a second visualization illustrating the identified set of one or more functions that correspond with the one or more criteria.

5. The computer-implemented method of claim 4, wherein the second visualization specifies each function that is part of a specified span as included in the one or more criteria, with each function represented in the second visualization as a corresponding frame.

6. The computer-implemented method of claim 4, further comprising:
    obtaining a selection of a frame in the second visualization; and
    causing display of a third visualization providing a stack trace providing details relating to a snapshot in which a function corresponding with the selected frame was identified according to a trace ID associated with the selected frame.

7. A computing device, comprising:
    a processor; and
    a non-transitory computer-readable medium having stored thereon instructions that, when executed by the processor, cause the processor to:
        capture, from a series of snapshots of one or more call stacks during a time duration, data relating to a plurality of functions executed in the time duration;
        receive, for each of the plurality of functions, function information specifying a span associated with the function and trace associated with the function;
        index the data relating to plurality of functions by the span and the trace associated with each function in the plurality of functions;
        receive a query specifying one or more criteria relating to at least one of a span or a trace;
        identify a set of one or more functions, from the plurality of functions, that correspond to the one or more criteria; and
        perform one or more actions based on the identified set of one or more functions, wherein the performing the one or more actions comprises causing a first visualization to be displayed in response to the received query, the first visualization including a frame for at least one function in the set of one or more functions, wherein a size of a frame displayed is based on a number of identified instances of the at least one function executed during the time duration.

8. The computing device of claim 7, wherein, for each function in the set of one or more functions, a frame corresponding to the function is displayed in a position in the first visualization based on a depth of the function in a call stack corresponding to the plurality of functions executed in the time duration.

9. The computing device of claim 7, wherein the first visualization comprises a flamegraph.

10. The computing device of claim 7, wherein the first visualization comprises a plurality of frames that are arranged according to trace identifiers specifying snapshots in which each function is detected during the time duration.

11. A non-transitory, computer-readable medium having stored thereon instructions that, when executed by one or more processors, cause the one or more processors to perform a process comprising:
  capturing, from a series of snapshots of one or more call stacks during a time duration, data relating to a plurality of functions executed in the time duration;
  receiving, for each of the plurality of functions, function information specifying a span associated with the function and a trace associated with the function;
  indexing the data relating to the plurality of functions by the span and the trace associated with each function in the plurality of functions;
  receiving a query specifying one or more criteria relating to at least one of a span or a trace;
  identifying a set of one or more functions, from the plurality of functions, that correspond to the one or more criteria; and
  performing one or more actions based on the identified set of one or more functions, wherein the performing the one or more actions comprises causing a first visualization to be displayed in response to the received query, the first visualization including a frame for at least one function in the set of one or more functions, wherein a size of a frame displayed is based on a number of identified instances of the at least one function executed during the time duration.

12. The non-transitory, computer-readable medium of claim 11, wherein, for each function in the set of one or more functions, a frame corresponding to the function is displayed in a position in the first visualization based on a depth of the function in a call stack corresponding to the plurality of functions executed in the time duration.

13. The non-transitory, computer-readable medium of claim 11, wherein performing the one or more actions includes generating a second visualization identifying all functions that correspond to the one or more criteria.

14. The non-transitory, computer-readable medium of claim 13, wherein the second visualization specifies each function part of a span that corresponds to the criteria, with each function represented in the second visualization as a corresponding frame.

15. The non-transitory, computer-readable medium of claim 13, wherein the process further comprises:
  obtaining a selection of a second frame in the second visualization; and
  causing display of a third visualization providing a stack trace providing details relating to a snapshot in which the second frame was identified according to a trace ID associated with the second frame.

* * * * *